Patented Apr. 3, 1923.

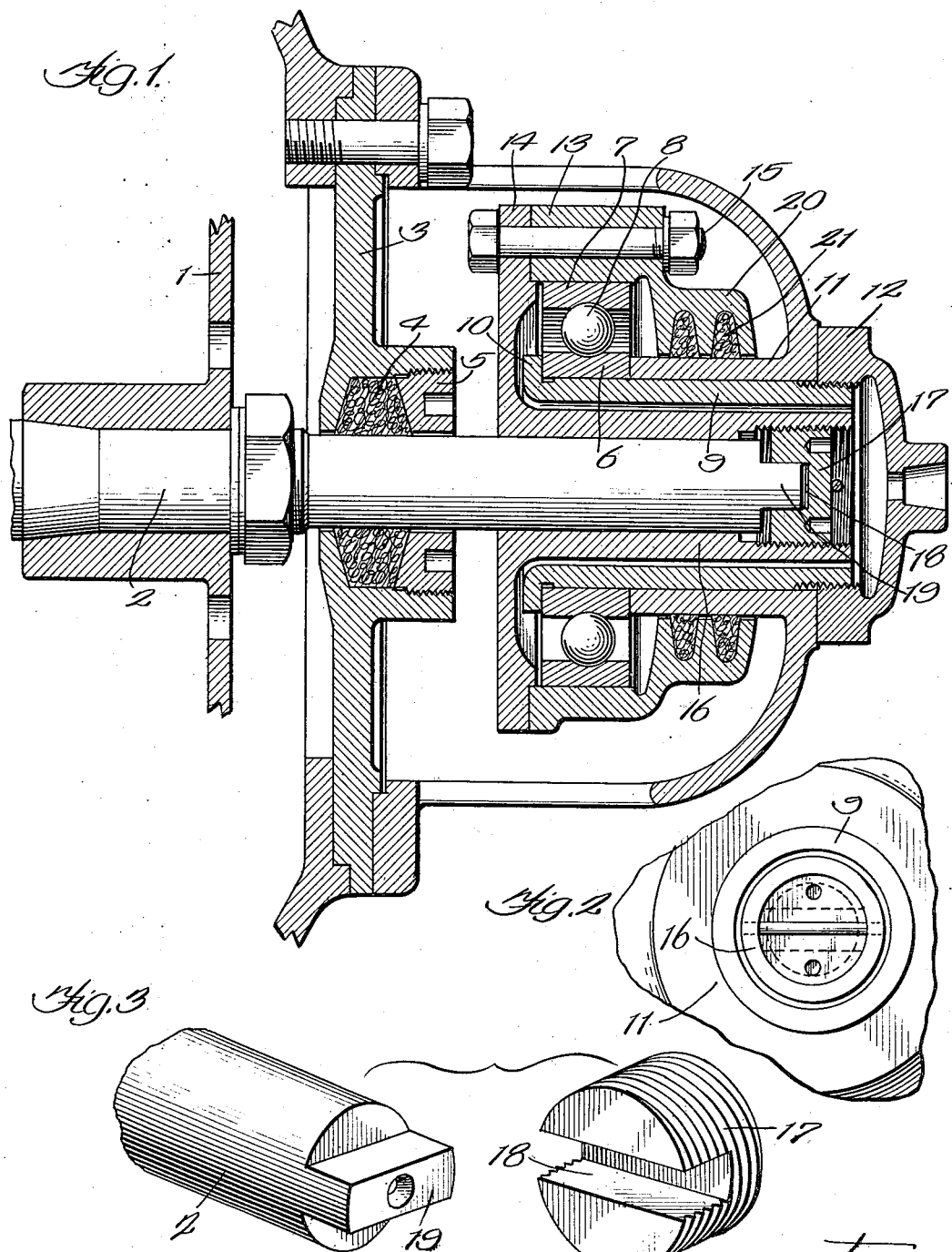

1,450,309

UNITED STATES PATENT OFFICE.

MARK A. ROSS, OF FLOSSMOOR, ILLINOIS, ASSIGNOR OF ONE-HALF TO HARRY P. BAYLEY, OF CHICAGO, ILLINOIS.

BEARING.

Application filed November 16, 1921. Serial No. 515,553.

*To all whom it may concern:*

Be it known that I, MARK A. ROSS, citizen of the United States, residing at Flossmoor, in the county of Cook and State of Illinois, have invented a certain new and useful Improvement in Bearings, of which the following is a full, clear, concise, and exact description.

My invention relates to steam turbines and to bearings that may be employed therein, the invention having for one object the provision of an improved construction of the bearings and an improved assembly thereof with the balance of the structure and also the provision of improved means for preventing the access of moisture to said bearings.

A turbine constructed in accordance with the invention is inclusive of the impact wheel thereof, a shaft carrying said wheel, a bearing structure for said shaft, inner and outer raceways, rollers between said raceways, a sleeve surrounded by the inner raceway and having a flange engaging one side thereof, a second sleeve surrounding the first and engaging the other side of said inner raceway, means for effecting relative movement between said sleeves to hold the inner raceway, a carrier for and surrounding the outer raceway, and fluid tight packing between said carrier and the second aforesaid sleeve.

The invention will be fully explained by reference to the accompanying drawing showing the preferred embodiment thereof and in which Fig. 1 is a longitudinal sectional view of enough of a turbine structure to understand the nature of the invention; Fig. 2 is a view of the outer end portion of the structure shown in Fig. 1 with the cap nut at the right of the structure of Fig. 1 removed; and Fig. 3 indicates two component elements of the structure in separated relation.

Like parts are indicated by similar characters of reference throughout the different figures.

The turbine illustrated includes any usual or suitable form of impact wheel 1 mounted upon a shaft 2. A bearing structure is provided for the shaft, this bearing structure being inclusive of a wall 3 through which the shaft projects and between which and the shaft there is provided a fluid tight packing 4 that is held in place by a ring 5 that is in threaded engagement with the packing receiving portion of the wall 3 whereby the packing is crowded into fluid tight engagement with the shaft 2. The wall 3 is in supporting relation to the inner raceway 6 which is surrounded by an outer raceway 7, there being balls 8 or other suitable rollers between said raceways. A sleeve 9 is surrounded by the raceway and has a flange 10 upon its inner end that is in engagement with one side of this raceway. A second sleeve 11 is carried by the wall 3 and has one end in engagement with the other side of the inner raceway 6. The sleeve 11 surrounds the sleeve 9, the latter sleeve being movable longitudinally of the former. A cap nut is in threaded engagement with the movable sleeve 9 and engages the other end of the stationary sleeve 11 whereby the inner raceway 6 may be clamped or held in place between the two sleeves. The raceway 7 is provided upon and within the carrier or bearing member that is formed of a ring 13 and a supporting member 14, these two elements being bolted together by means of the bolts 15. Said carrier or bearing member is formed with a hollow extension 16 into which the shaft projects and in which the shaft terminates. This hollow extension projects away from the impact wheel and has an end wall 17 that is in threaded connection with the balance of this extension and is placed opposite the end of the shaft that is within this extension. This end wall has a key slot 18 that receives a diametrical key 19 formed upon the adjacent end of the shaft whereby the extension 16 and the shaft 2 are assembled so as to turn together to cause the outer raceway 7 also to turn with the shaft.

The bearing member portion 13 is, in effect, a second hollow extension upon the part 14 and is itself provided with a further extension 20 which carries fluid tight packing 21 that engages the stationary sleeve 11. The wall 3 is interposed between the impact wall 1 and the elements of the bearing that are at the outer end of the shaft 2, and the roller bearing structure is interposed between the packing 21 and the wall 3. By reason of the closed tubular extension 16 and the arrangement of the packing 21 and the packing 4, the elements of the roller bearing are thoroughly guarded from access thereto of moisture from the turbine.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. In a turbine, the combination with the impact wheel thereof; of a shaft carrying said wheel; a bearing structure for said shaft and having a wall through which said shaft projects; fluid tight packing between said shaft and wall; inner and outer raceways; rollers between said raceways; a sleeve surrounded by the inner raceway and having a flange engaging one side thereof, said wall being between this sleeve and the impact wheel; a second sleeve surrounding the first and joined with said wall, this second sleeve engaging the other side of said inner raceway; means for effecting relative movement between said sleeves to hold the inner raceway; a carrier for and surrounding the outer raceway; and fluid tight packing between said carrier and the second aforesaid sleeve.

2. In a turbine, the combination with the impact wheel thereof; of a shaft carrying said wheel; a bearing structure for said shaft; inner and outer raceways; rollers between said raceways; a sleeve surrounded by the inner raceway and having a flange engaging one side thereof; a second sleeve surrounding the first and engaging the other side of said inner raceway; means for effecting relative movement between said sleeves to hold the inner raceway; a carrier for and surrounding the outer raceway; and fluid tight packing between said carrier and the second aforesaid sleeve.

3. In a turbine, the combination with the rotating shaft thereof: of an impact wheel upon the shaft; a bearing member turning with the shaft and formed with a hollow extension into which said shaft projects and in which the shaft terminates, said hollow extension projecting away from the impact wheel and having an end wall opposite the end of the shaft that is in this hollow extension, this end wall having key connection with this shaft end, said bearing member also having a second hollow extension surrounding and spaced apart from the first hollow extension; an outer roller bearing raceway upon and within the second hollow extension; an inner raceway; rollers between said raceways; a sleeve in the space between said hollow extensions and having one end engaging one side of the inner raceway; a second sleeve surrounded by and movable longitudinally of the first and engaging the other side of the inner raceway; and a nut in threaded engagement with the second sleeve and abutting against the other end of the first sleeve to hold the inner raceway between said sleeves.

4. The combination with a rotating shaft; of a bearing member turning with the shaft and formed with a hollow extension into which said shaft projects and in which the shaft terminates, said hollow extension having an end wall opposite the end of the shaft that is in this hollow extension, this end wall having key connection with this shaft end, said bearing member also having a second hollow extension surrounding and spaced apart from the first hollow extension; an outer roller bearing raceway upon and within the second hollow extension; an inner raceway; rollers between said raceways; a sleeve in the space between said hollow extensions and having one end engaging one side of the inner raceway; a second sleeve surrounded by and movable longitudinally of the first and engaging the other side of the inner raceway; and a nut in threaded engagement with the second sleeve and abutting against the other end of the first sleeve to hold the inner raceway between said sleeves.

5. In a turbine, the combination with the rotating shaft thereof; of an impact wheel upon the shaft; a bearing member turning with the shaft and formed with a hollow extension into which said shaft projects and in which the shaft terminates, said hollow extension projecting away from the impact wheel and having an end wall in threaded connection with the balance of the extension and placed opposite the end of the shaft that is in this hollow extension, this end wall having key connection with this shaft end, said bearing member also having a second hollow extension surrounding and spaced apart from the first hollow extension; an outer roller bearing raceway upon and within the second hollow extension; an inner raceway; rollers between said raceways; a sleeve in the space between said hollow extensions and having one end engaging one side of the inner raceway; a second sleeve surrounded by and movable longitudinally of the first and engaging the other side of the inner raceway; and a nut in threaded engagement with the second sleeve and abutting against the other end of the first sleeve to hold the inner raceway between said sleeves.

6. The combination with a rotating shaft; of a bearing member turning with the shaft and formed with a hollow extension into which said shaft projects and in which the shaft terminates, said hollow extension having an end wall in threaded connection with the balance of the extension and placed opposite the end of the shaft that is in this hollow extension, this end wall having key connection with this shaft end, said bearing member also having a second hollow extension surrounding and spaced apart from the first hollow extension; an outer roller bearing raceway upon and within the second hollow extension; an inner raceway; rollers between said raceways; a sleeve in the space between said hollow extensions and having one end engaging one side of the inner raceway; a second sleeve surrounded by and movable longitudinally of the first and engaging the other side of the inner raceway; and a nut in threaded engagement with the second sleeve and abutting against the other end of the first sleeve to hold the inner raceway between said sleeves.

7. In a turbine, the combination with the rotating shaft thereof; of an impact wheel upon the shaft; and a bearing member turning with the shaft and formed with a hollow extension into which said shaft projects and in which the shaft terminates, said hollow extension projecting away from the impact wheel and having an end wall in key connection with the adjacent end of the shaft.

8. In a turbine, the combination with the rotating shaft thereof; of an impact wheel upon the shaft; and a bearing member turning with the shaft and formed with a hollow extension into which said shaft projects and in which the shaft terminates, said hollow extension projecting away from the impact wheel and having a separable end wall in key connection with the adjacent end of the shaft.

In witness whereof, I hereunto subscribe my name this 9th day of November, A. D. 1921.

MARK A. ROSS